US010503827B2

(12) United States Patent
Kurata et al.

(10) Patent No.: US 10,503,827 B2
(45) Date of Patent: Dec. 10, 2019

(54) SUPERVISED TRAINING FOR WORD EMBEDDING

(71) Applicant: INTERNATIONAL BUSINESS MACHINES CORPORATION, Armonk, NY (US)

(72) Inventors: Gakuto Kurata, Tokyo (JP); Masayuki Suzuki, Tokyo (JP); Ryuki Tachibana, Kanagawa-Ken (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 336 days.

(21) Appl. No.: 15/275,029

(22) Filed: Sep. 23, 2016

(65) Prior Publication Data
US 2018/0090128 A1   Mar. 29, 2018

(51) Int. Cl.
  G06F 17/27  (2006.01)
(52) U.S. Cl.
  CPC .................................. *G06F 17/27* (2013.01)
(58) Field of Classification Search
  None
  See application file for complete search history.

(56) References Cited

U.S. PATENT DOCUMENTS

| 8,874,432 B2 | 10/2014 | Qi et al. |
| 9,135,241 B2 | 9/2015 | Bangalore et al. |
| 2015/0066496 A1 | 3/2015 | Deoras et al. |
| 2017/0193397 A1* | 7/2017 | Kottha ................ G06F 17/2785 |

OTHER PUBLICATIONS

Jian Wang, Jianhai Zhang, Yuan An, Hongfei Lin, Zhihao Yang, Yijia Zhang,Yuanyuan Sun; Biomedical event trigger detection by dependency-based word embedding; Aug. 10, 2016; BMC Med Genomics; pp. All URL: https://www.ncbi.nlm.nih.gov/pmc/articles/PMC4980775/.*

(Continued)

*Primary Examiner* — Richa Mishra
(74) *Attorney, Agent, or Firm* — Tutunjian & Bitetto, P.C.; Vazken Alexanian (57) ABSTRACT

A method and system are provided for training word embedding of domain-specific words. The method includes training, by a processor, a first word embedding, using a general domain corpus, on one or more terms inputted by a user. The method further includes retraining, by the processor, the first word embedding, using a specific domain corpus, for a Neuro-Linguistic Programming task, to create a tuned word embedding. The method also includes training, by the processor, a Neural Network for the Neuro-Linguistic Programming task, using the specific domain corpus. The method additionally includes incorporating, by the processor, the trained Neural Network and tuned word embedding into a Neural Network-based Neuro-Linguistic Programming task. The retraining of the first word embedding and the training of the Neural Network are performed together, and the tuned word embedding is accelerated due to a change in a hyper parameter for domain-specific words.

14 Claims, 7 Drawing Sheets

(56) References Cited

OTHER PUBLICATIONS

Mi-Young Kim and Randy Goebel; Detection and Normalization of Medical Terms Using Domain-specific Term Frequency and Adaptive Ranking; IEEE, Coferance Date Nov. 3-5, 2010; pp. All URL https://ieeexplore.ieee.org/document/5687670/.*

Jian Wang, Jianhai Zhang, Yuan An, Hongfei Lin, Zhihao Yang, Yijia Zhang,Yuanyuan Sun; Biomedical event trigger detection by dependency-based word embedding; Aug. 10, 2016; BMC Med Genomics; pp. AllURL: https://www.ncbi.nlm.nih.gov/pmc/articles/PMC4980775/ (Year: 2016).*

Mi-Young Kim and Randy Goebel; Detection and Normalization of Medical Terms Using Domain-specific Term Frequency and Adaptive Ranking; IEEE, Coferance Date Nov. 3-5, 2010; pp. All URL https://ieeexplore.ieee.org/document/5687670/ (Year: 2010).*

Lebret, et al., "Word Embeddings through Hellinger PCA", Proceedings of the 14th Conference of the European Chapter of the Association for Computational Linguistics, Apr. 2014, pp. 482-490.

Kim, Yoon, "Convolutional Neural Networks for Sentence Classification", Proceedings of the 2014 Conference on Empirical Methods in Natural Language Processing (EMNLP), Oct. 2014, pp. 1746-1751.

Zhou, at al. "Category Enhanced Word Embedding", arXiv.org, Nov. 2015, 10 Pages.

Celikyilmaz, et al., "Enriching Word Embeddings Using Knowledge Graph for Semantic Tagging in Conversational Dialog Systems", Knowledge Representation and Reasoning: Integrating Symbolic and Neural Approaches: Papers from the 2015 AAAI Spring Symposium, Jan. 2015, pp. 39-42.

Luo et al., "Pre-Trained Multi-View Word Embedding Using Two-side Neural Network", Proceedings of the Twenty-Eighth AAAI Conference on Artificial Intelligence, Jul. 2013, pp. 1983-1988.

Kenter, et al., "Short Text Similarity with Word Embeddings", CIKM'15, Oct. 2015, 10 pages.

Goggle, Google Code Archive Long Term Storage for Google Code Project Hosting, Last accessed Apr. 21, 2016, 8 Pages.

* cited by examiner

FIG. 7

SUPERVISED TRAINING FOR WORD EMBEDDING

BACKGROUND

Technical Field

The present invention generally relates to word embedding, and, more particularly, to training word embedding of domain-specific words and phrases.

Description of the Related Art

Word embedding is a collective term used to describe techniques involving language modeling and feature learning in natural language processing, wherein identified words and phrases are mapped to vectors of real numbers. Word embedding using training methods incorporating unsupervised learning, such as, e.g., the use of skip n-grams, has been found to be successful.

Word embedding of similar words or phrases, wherein the word embedding is trained using unsupervised data, such as a general domain corpus (such as, e.g., Wikipedia corpus), has been found to have large cosine similarity. For example, using unsupervised word embedding, user inquiries such as "Tell me recommended cars of Mercedes-Benz®" and "Tell me recommended cars of BMW®" would likely result in a large cosine similarity of the vector representations of the inquiries. This is due to the two individual inquiries having similar inquiries concerning car recommendations. However, although both inquiries involve requesting car recommendations, accurate results for the query "Tell me recommended cars of Mercedes-Benz®" would be entirely different from accurate results for the query "Tell me recommended cars of BMW®." This is due to the fact that Mercedes-Benz® and BMW® produce different automobiles.

This large cosine similarity can result in confusing, inadequate, and inaccurate results returned to a user, especially since, for a specific domain, the words or phrases can appear similar in scope but can include completely different information. Thus, there is a need for an improved approach for performing training for word embedding.

SUMMARY

According to an aspect of the present invention, a method is provided for training word embedding of domain-specific words. The method includes training, by a processor, a first word embedding, using a general domain corpus, on one or more terms inputted by a user. The method further includes retraining, by the processor, the first word embedding, using a specific domain corpus, for a Neuro-Linguistic Programming task, to create a tuned word embedding. The method also includes training, by the processor, a Neural Network for the Neuro-Linguistic Programming task, using the specific domain corpus. The method additionally includes incorporating, by the processor, the trained Neural Network and tuned word embedding into a Neural Network-based Neuro-Linguistic Programming task. The retraining of the first word embedding and the training of the Neural Network are performed together, and the tuned word embedding is accelerated due to a change in a hyper parameter for domain-specific words.

According to another aspect of the present invention, a system is provided for training word embedding of domain-specific words. The system includes a graphical user interface configured to enable a user to input one or more terms. The system further includes a processor, configured to train a first word embedding, using a general domain corpus, on the one or more terms inputted by a user. The processor is further configured to retrain the first word embedding, using a specific domain corpus, for a Neuro-Linguistic Programming task, to create a tuned word embedding. The processor is also configured to train a Neural Network for the Neuro-Linguistic Programming task, using the specific domain corpus. The processor is additionally configured to incorporate the trained Neural Network and tuned word embedding into a Neural Network-based Neuro-Linguistic Programming task. The system also includes a memory configured to store the one or more terms and the tuned word embedding. The processor retrains the first word embedding and trains the Neural Network together. The tuned word embedding is accelerated due to a change in a hyper parameter for domain-specific words.

According to yet another aspect of the present invention, a non-transitory computer-readable storage medium is provided. The non-transitory computer-readable storage medium includes a computer-readable program for training word embedding of domain-specific words. The computer-readable program when executed on a computer causes the computer to perform a method. The method includes training, by a processor, a first word embedding, using a general domain corpus, on one or more terms inputted by a user. The method further includes retraining, by the processor, the first word embedding, using a specific domain corpus, for a Neuro-Linguistic Programming task, to create a tuned word embedding. The method also includes training, by the processor, a Neural Network for the Neuro-Linguistic Programming task, using the specific domain corpus. The method additionally includes incorporating, by the processor, the trained Neural Network and tuned word embedding into a Neural Network-based Neuro-Linguistic Programming task. The retraining of the first word embedding and the training of the Neural Network are performed together. The tuned word embedding is accelerated due to a change in a hyper parameter for domain-specific words.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

The present invention is directed to training word embedding of domain-specific words and phrases. According to the present invention, systems and methods are provided for training word embedding using supervised learning together with training a Neural Network (NN) for a specific Neuro-Linguistic Programming (NLP) task. In an embodiment, word embedding trained using unsupervised data is used as an initial value. Since supervised data is relatively small in many instances, the initial value for word embedding gathered from the use of unsupervised data is important.

The focus of the word embedding according to the present invention is on terminologies used in a specific domain corpus such as, e.g., proper nouns. The proper nouns can be, e.g., car names (for a car-related domain), brand names (for a brand-related domain), location names (for a geography-related domain), etc. Training word embedding using a domain specific corpus, in conjunction with training a NN for a specific NLP task, enables more accurate word embedding and, therefore, more accurate results being returned to a user.

Figure 1:
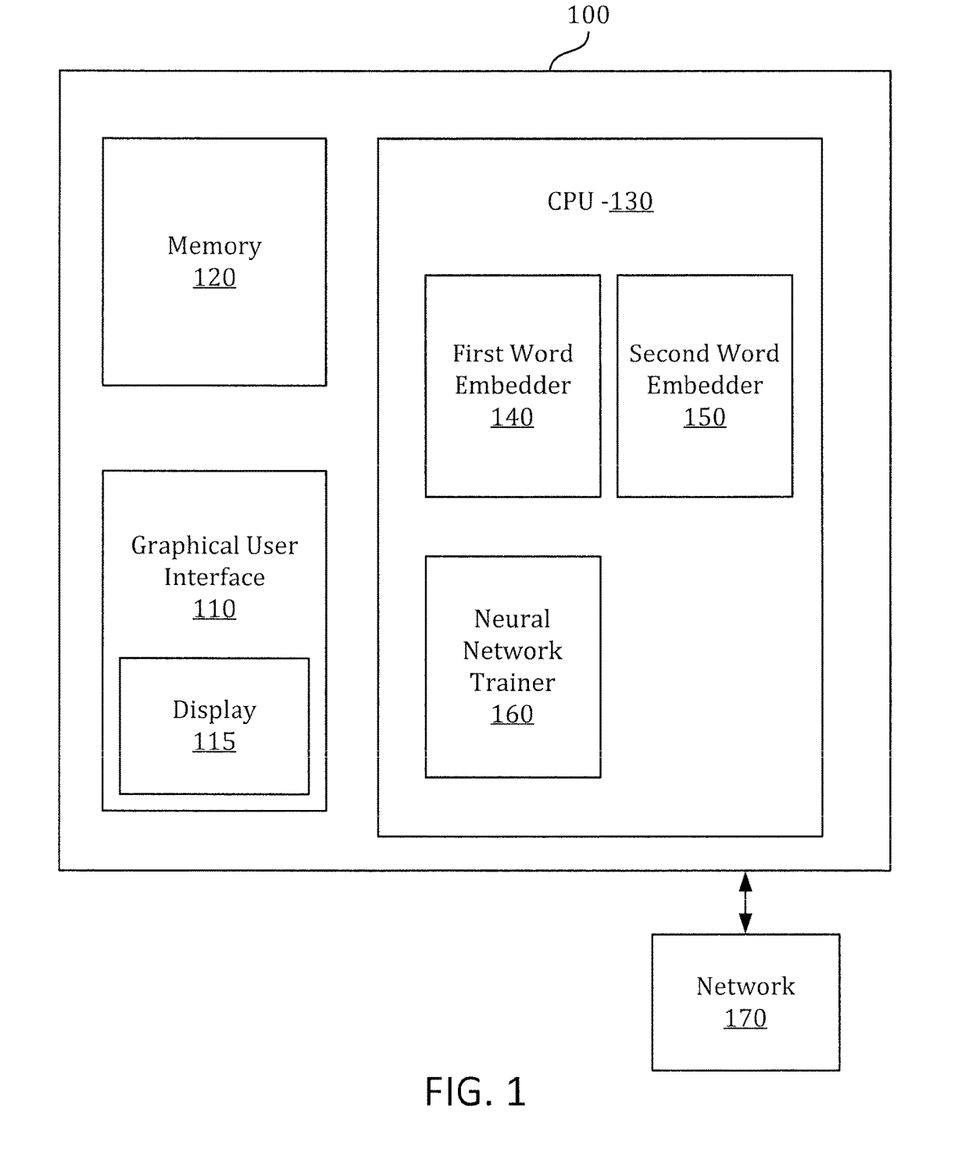
FIG. 1 shows an exemplary system for training word embedding and neural networks with reference to domain-specific words and phrases, according to an embodiment of the present invention.

Referring now to the drawings in which like numerals represent the same or similar elements and initially to FIG. 1, a block diagram of an exemplary system 100 for training word embedding of domain-specific words and phrases is shown in accordance with an embodiment of the present invention.

The system 100 includes one or more graphical user interfaces 110 (including one or more displays 115), one or more storage devices (memory) 120, and one or more processors (CPUs) 130, which include one or more of a first word embedder 140, a second word embedder 150, and an NN trainer 160.

A user, using the graphical user interface 110, inputs one or more terms (such as, e.g., words, phrases, etc.), into the system 100. The one or more terms can be stored in memory 120.

In an embodiment, a first word embedding, using the first word embedder 140, is performed on the one or more terms using unsupervised data, such as a general domain corpus. The general domain corpus can be, e.g., the Wikipedia corpus, etc. The general domain corpus can be stored in the memory 120 and/or can be located on a network 170.

Word embedding using unsupervised data can often lead to high degrees of cosine similarity between terms that should not have a high degree of cosine similarity. To correct for any inappropriate results that may be returned due to the high degree of cosine similarity between terms during the first word embedding, word embedding is re-initialized and the second word embedder 150 retrains the first word embedding, using supervised data. The result of the second word embedding is a tuned word embedding of the user inputted terms.

Retraining the first word embedding includes using supervised data for a specific NLP task, wherein the tuned word embedding is accelerated due to a change in a hyper parameter for domain-specific words. Hyper parameters include learning rates, dropout rates, weights for regularization terms (regularization parameters), etc. Rather than being model parameters that are learned in a training phase, hyper parameters are set by a priori. In conjunction with the retraining of the first word embedding, a NN is trained, using the NN trainer 160, for the specific NLP task.

Accelerating the tuned word embedding enables the learning rate to be increased, the dropout rate to be reduced, and the regularization parameters for the domain-specific words to be reduced.

The NLP task can include a list of terminologies in the domain specific corpus. In an embodiment, the list of terminologies is provided. The provided list of terminologies is then used during the retraining of the first word embedding and the training of the NN.

In an embodiment, the list of terminologies is not provided. If the list of terminologies is not provided, the list of terminologies is calculated. In an embodiment, the list of terminologies is automatically calculated by the system 100.

To automatically calculate the list of terminologies, the system 100 calculates the term frequency-inverse document frequency (tf-idf) for each word in a general domain corpus. The system 100 then calculates the tf-idf for each word in the specific domain corpus. Finally, processor 130 selects words in which the ratio of the tf-idf for each word in the general corpus to the tf-idf for each word in the specific domain corpus is larger than a threshold. The threshold can be a constant, can be determined by the system 100, can by inputted by a user, or can be determined by any other means in accordance with the present invention while maintaining the spirit of the present invention.

The system 100 then incorporates the trained NN and tuned word embedding into a NN-based NLP application. In an embodiment, the trained NN and tuned word embedding are used in conjunction with a search engine to more accurately produce results related to the terms the user initially inputted.

Figure 2:
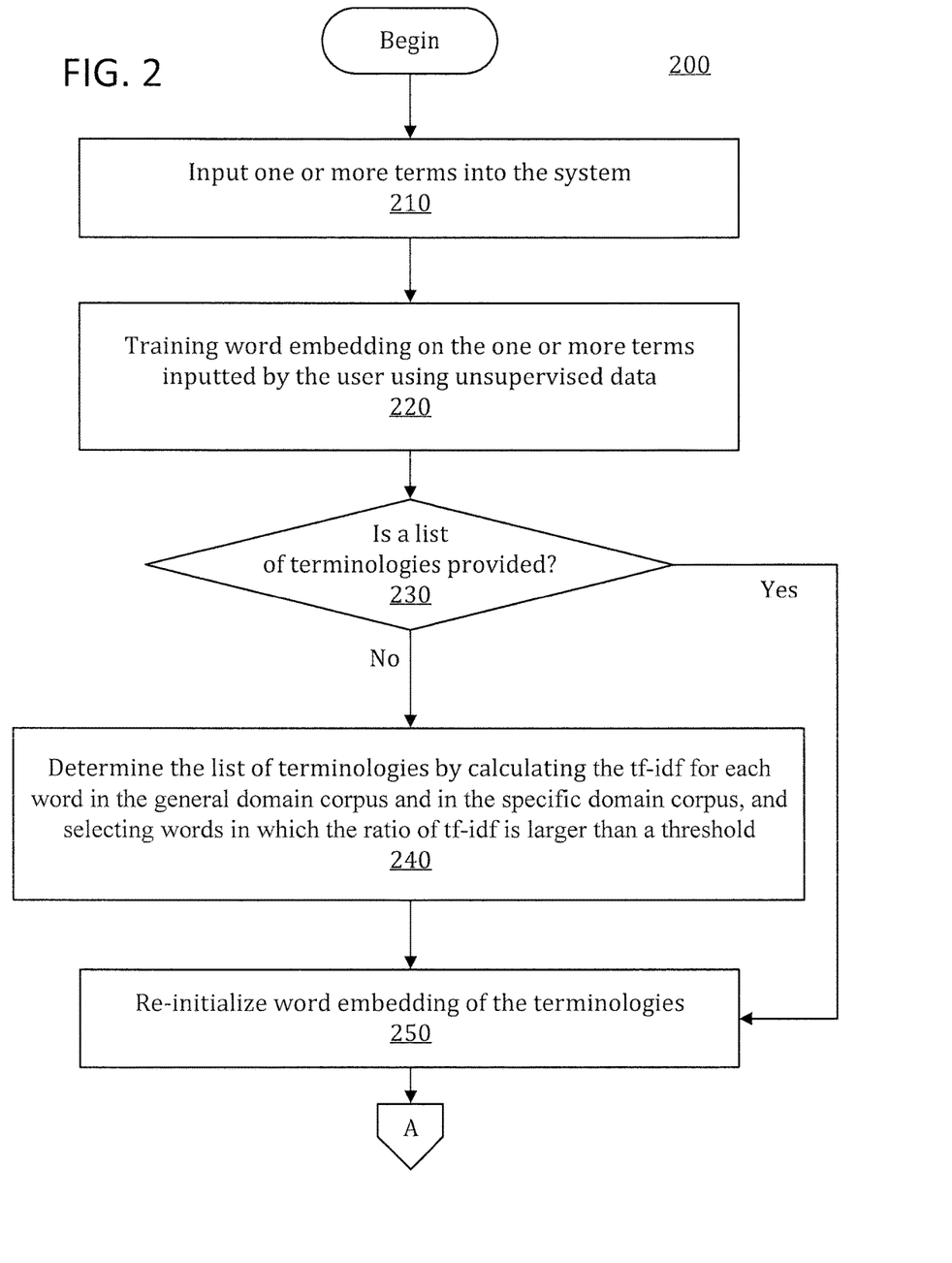
FIGS. 2-3 show an exemplary method for training word embedding and neural networks with reference to domain-specific words and phrases, according to an embodiment of the present invention.
Figure 3:
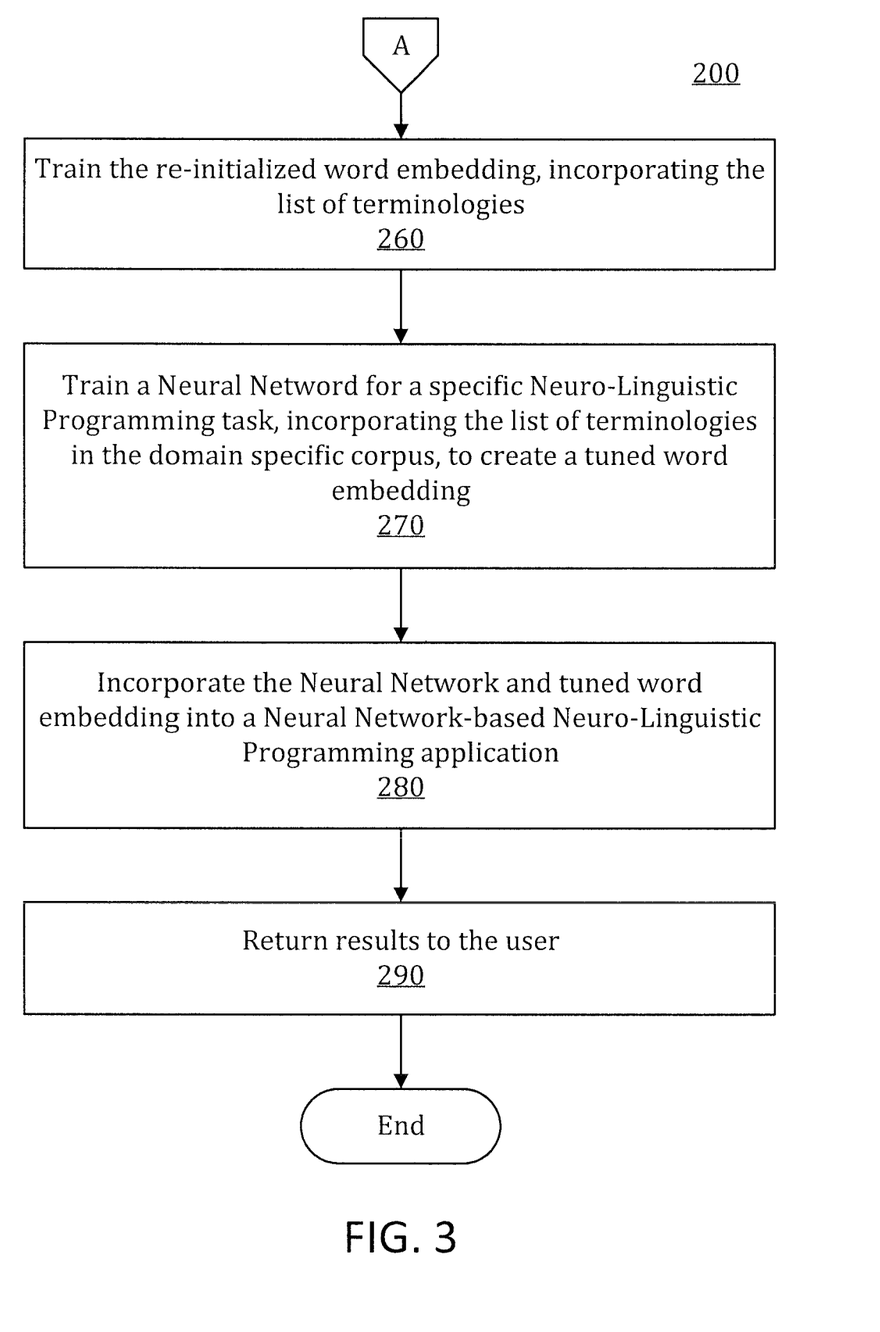

Referring now to FIGS. 2-3, an exemplary method 200 for training word embedding of domain-specific terms is shown in accordance with an embodiment of the present invention.

As a brief overview of the specific steps described in FIG. 2, the following applies. One or more terms are input by a user. A first word embedding is trained on the one or more terms, using unsupervised data. The first word embedding is retrained using a list of terminologies from supervised data, wherein the list of terminologies is either provided or determined. Additionally, a NN is trained for a specific NLP task. The retraining of the first word embedding and the training of the NN are performed in conjunction with each other.

At step 210, input one or more terms, from a user, into the system 100. The terms can be inputted into the system via one or more graphical user interfaces 110. In an embodiment, the one or more terms represent a query.

At step 220, train a first word embedding on the one or more terms inputted by the user, using unsupervised data. The unsupervised data can include a general domain corpus. Training the first word embedding using unsupervised data can result in high cosine similarities between multiple words or phrases that, in fact, include entirely different information. This can lead to inappropriate results that can be returned to a user.

At step 230, determine if a list of terminologies in a specific domain corpus is provided. If so, proceed to step 250. Otherwise, proceed to step 240.

At step 240, determine the list of terminologies by calculating the tf-idf for each word in a general domain corpus, calculating the tf-idf for each word in the specific domain corpus, and selecting words in which the ratio of the tf-idf for each word in the general corpus to the tf-idf for each word in the specific domain corpus is larger than a threshold. The threshold can be constant, can be determined by the system 100, can be inputted by a user, or can be determined by any other means in accordance with the present invention while maintaining the spirit of the present invention.

At step 250, re-initialize the word embedding, incorporating the list of terminologies in the specific domain corpus for an NLP task, to retrain the first word embedding and correct for any inappropriate results that can be returned due to the high degree of cosine similarity between multiple words or phrases during the first word embedding.

At step 260, train the re-initialized word embedding, incorporating the list of terminologies in the domain specific corpus for the NLP task, to create a tuned word embedding.

At step 270, train a NN for a specific NLP task, incorporating supervised data for the NLP task. The supervised data can include the list of terminologies in the specific domain corpus. In an embodiment, steps 260 and 270 are performed together, and wherein the tuned word embedding is accelerated due to a change in a hyper parameter for domain-specific words.

At step 280, incorporate the NN and tuned word embedding into a NN-based NLP application.

At step 290, return any results gathered from the use of the tuned word embedding and trained NN. In an embodiment, the results are displayed to the user on a display 115.

Figure 4:
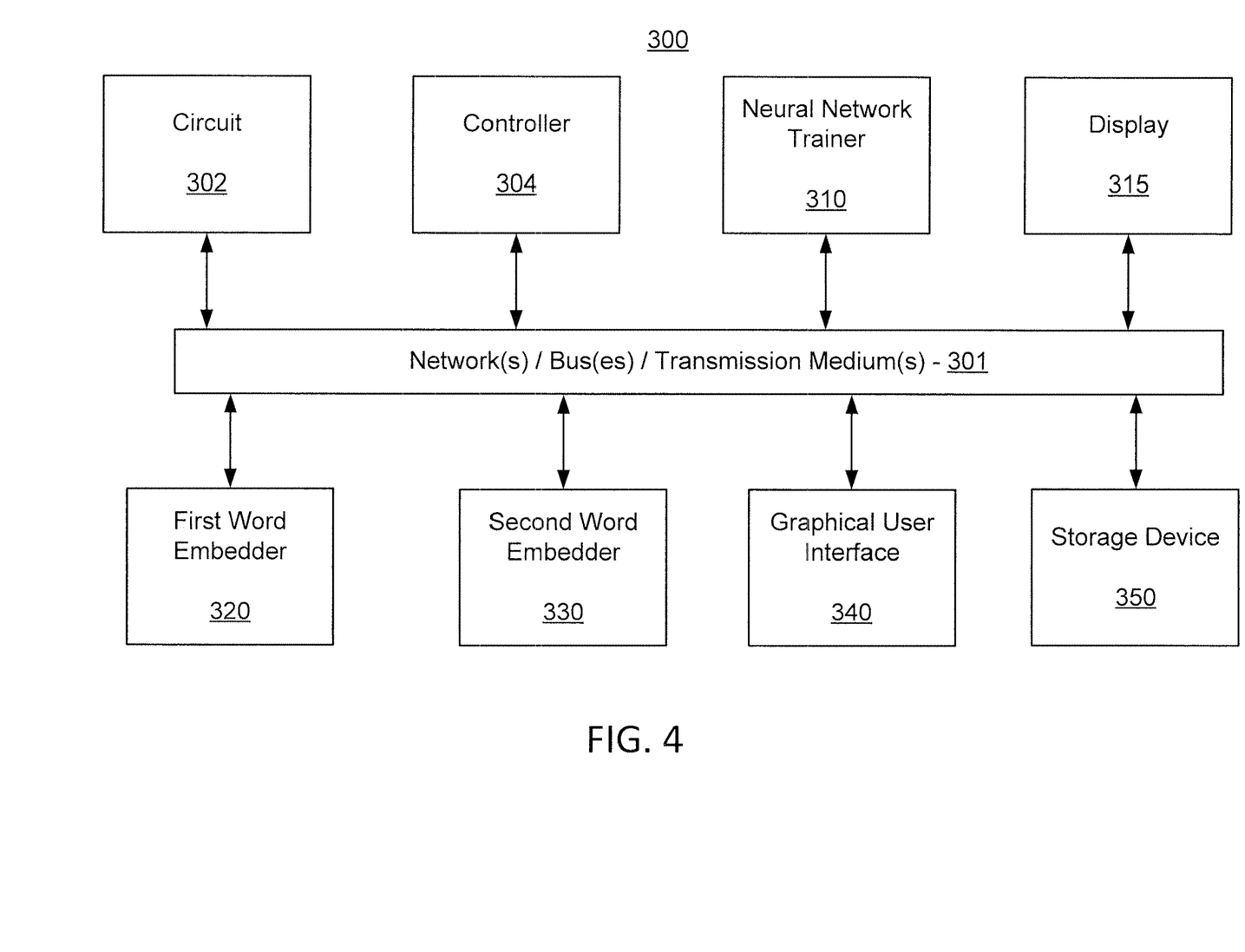
FIG. 4 shows an exemplary system for training word embedding and neural networks with reference to domain-specific words and phrases, according to an embodiment of the present invention.

Referring now to FIG. 4, an exemplary system 300 for training word embedding of domain-specific words and phrases is illustratively depicted in accordance with an embodiment of the present invention.

While many aspects of system 300 are described in singular form for the sake of illustration and clarity, the same can be applied to multiple ones of the items mentioned with respect to the description of system 300. For example, while a single display 315 may be mentioned with respect to system 300, more than one display 315 can be used in accordance with the teachings of the present invention, while maintaining the spirit of the present invention. Moreover, it is appreciated that the display 315 is but one aspect involved with system 300 that can be extended to plural form while maintaining the spirit of the present invention.

In an embodiment, the system 300 can include a plurality of components, which can include one or more circuits 302, controllers 304, neural network trainers 310, displays 315, first word embedders 320, second word embedders 330, graphical user interfaces 340, and/or storage devices 350 (e.g., computer readable storage medium). The above components can be connected by, for example, one or more networks, buses, or transmission mediums 301, wherein the one or more networks can include one or more wired or wireless networks such as, e.g., WIFI, Bluetooth®, etc., and the one or more transmission mediums can include bounded transmission media, such as, e.g., coaxial cable, fiber optics, etc., and unbounded transmission media, such as, e.g., radio transmission, microwave transmission, etc. Furthermore, data (e.g., system condition data, temperature, voltage, etc.) can be collected according to various embodiments of the present invention. The bus can be connected to any components via a wired or wireless connection.

In an embodiment, the graphical user interface 340 can be employed to enable a user to input one or more terms including, e.g., words, phrases, etc.

In an embodiment, the first word embedder 320 can be employed to perform a first word embedding on the one or more terms using unsupervised data, such as a general domain corpus. The general domain corpus can be, e.g., the Wikipedia corpus, etc., and may be stored on the one or more storage devices 350.

In an embodiment, the second word embedder 330 can be employed to retrain the first word embedding, using supervised data, to correct for any inappropriate results that may be returned due to a high degree of cosine similarity between multiple terms during the first word embedding. The result of retraining the first embedding is a tuned word embedding of the user inputted terms.

In an embodiment, the neural network trainer 310 can be employed to train a NN for a specific NLP task, wherein the tuned word embedding is accelerated due to a change in a hyper parameter for domain-specific words.

At least one storage device 350 can be employed to store, e.g., the one or more terms inputted by the user, the list of terminologies, etc.

Figure 5:
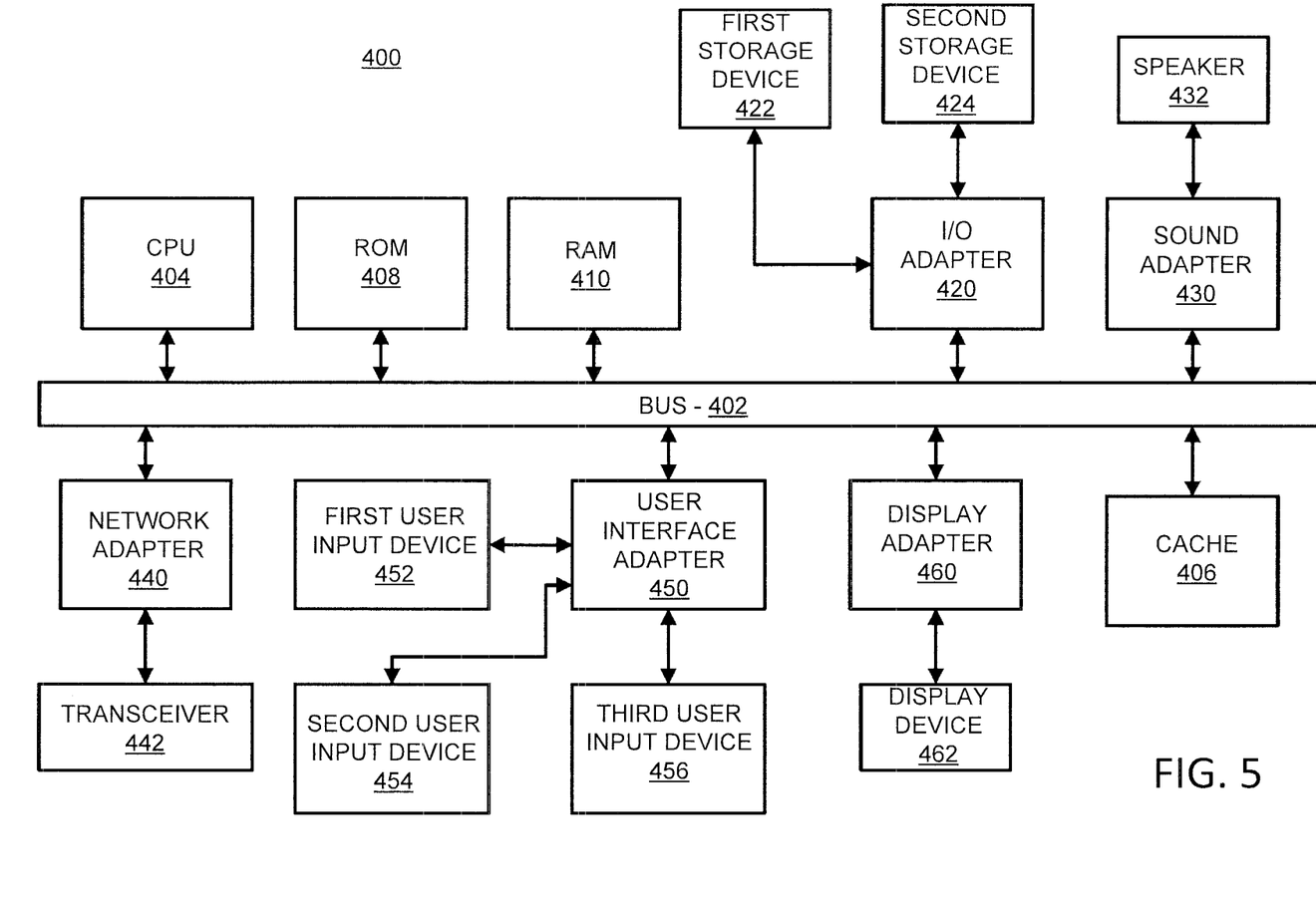
FIG. 5 shows an exemplary processing system to which the present invention can be applied, according to an embodiment of the present invention.

Referring now to FIG. 5, an exemplary processing system 400 to which the present invention can be applied is shown in accordance with an embodiment of the present invention. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 452, 454, and 456 can be the same type of user input device or different types of user input devices. The user input devices 452, 454, and 456 are used to input and output information to and from system 400.

Of course, the processing system 400 can also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

Moreover, it is to be appreciated that system 100, described with respect to FIG. 1, is a block diagram showing a system 100 for implementing respective embodiments of the present invention. Part or all of processing system 100 may be implemented in one or more of the elements of system 400 of FIG. 5.

Further, it is to be appreciated that processing system 400 may perform at least part of the methods described herein including, for example, at least part of method 200 of FIGS. 1-2. Similarly, part or all of system 300 of FIG. 4 may be used to perform at least part of the methods described herein including, for example, method 200 of FIGS. 2-3.

There are many applications of word embedding technology to which the present invention can be readily applied, given the teachings of the present invention provided herein. For example, word embedding in accordance with the present invention can be used as an input in Neural Network-based (NN-based) Neuro-Linguistic Programming (NLP) applications, such as, e.g., Convolutional Neural Network-based (CNN-based) question answering tasks or any other type of neural network based question answering task, neural network based generation of conversational responses, neural network based sentiment analysis, and so forth. The preceding applications are merely illustrative and, thus, the present invention can also be used with other applications as readily contemplated by one of ordinary skill in the art, while maintaining the spirit of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
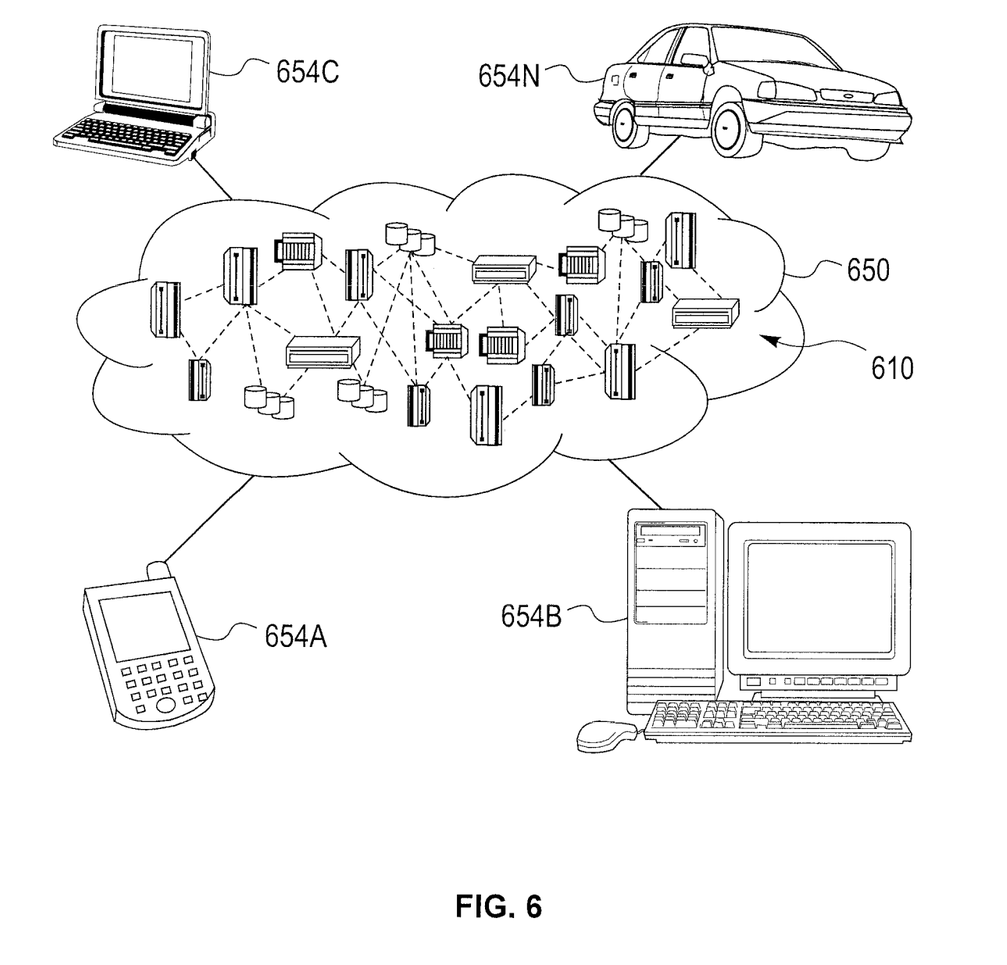
FIG. 6 depicts a cloud computing environment according to an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
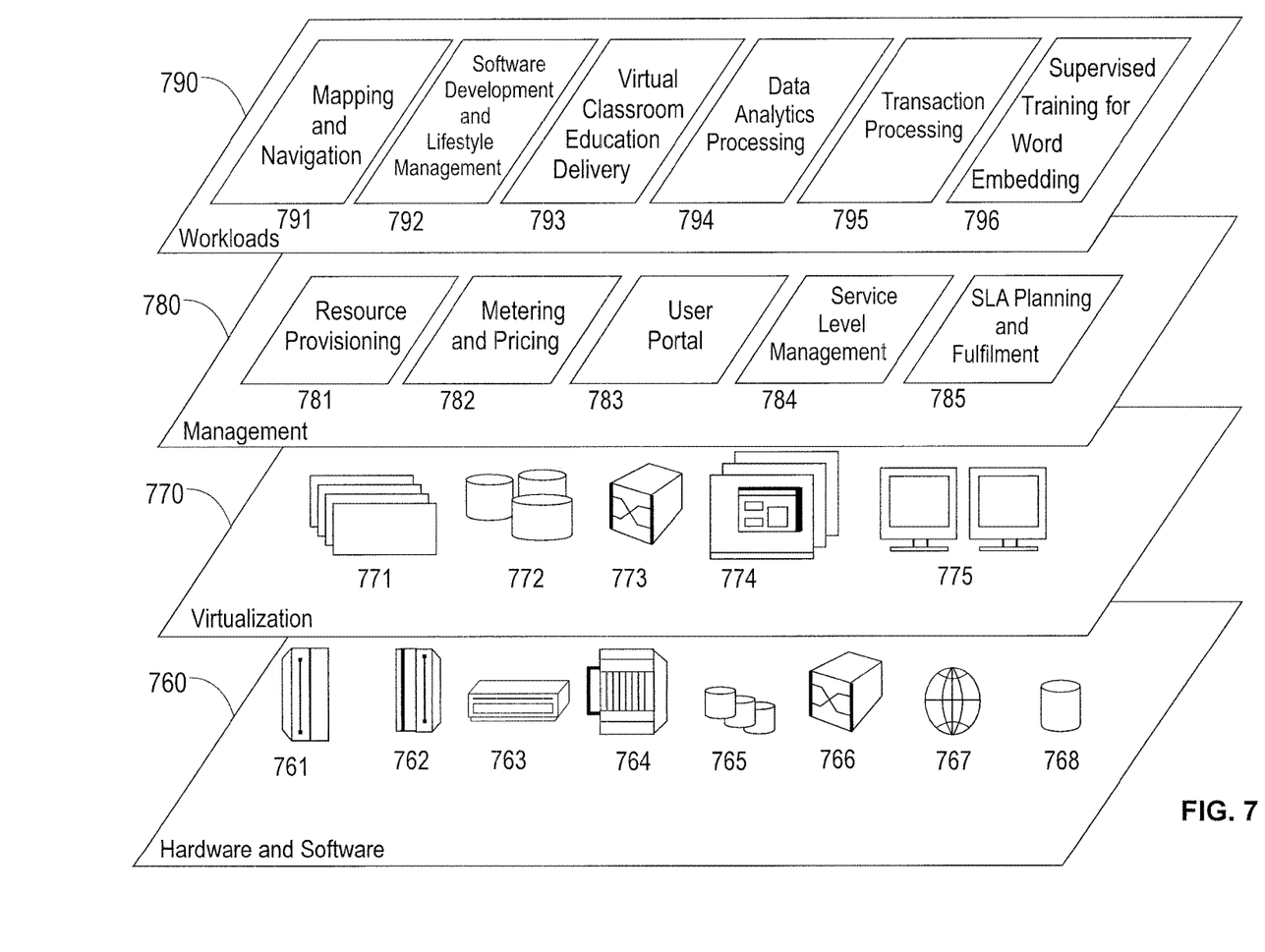
FIG. 7 depicts abstraction model layers according to an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and supervised training for word embedding 796. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:
1. A method for training word embedding of domain-specific words, comprising:
   training, by a processor, a first word embedding, using unsupervised data including a general domain corpus, on one or more terms inputted by a user;
   retraining, by the processor, the first word embedding, using a specific domain corpus, for a Neuro-Linguistic Programming task, to create a tuned word embedding, wherein the retraining of the first word embedding includes incorporating a list of terminologies from the domain specific corpus, and wherein the retraining of the first word embedding includes determining the list of terminologies by:
   calculating a term frequency-inverse document frequency for each term in the general domain corpus;
   calculating a term frequency-inverse document frequency for each term in the specific domain corpus; and
   selecting terms in which a ratio of the term frequency-inverse document frequency for each word in the general corpus to the term frequency-inverse document frequency for each word in the specific domain corpus is larger than a predefined threshold, wherein the retraining of the first word embedding corrects for inappropriate results due to a high degree of cosine similarity between multiple words of phrases in the first word embedding;
   training, by the processor, a Neural Network for the Neuro-Linguistic Programming task, using the specific domain corpus; and
   incorporating, by the processor, the trained Neural Network and tuned word embedding into a Neural Network-based Neuro-Linguistic Programming task,
   wherein the retraining of the first word embedding and the training of the Neural Network are performed together, and wherein the tuned word embedding is accelerated due to a change in a hyper parameter for domain-specific words.
2. The method of claim 1, wherein the hyper parameter is selected from the group consisting of a learning rate, a dropout rate, and a weight for a regularization term, and wherein, if the hyper parameter increases, the learning rate increases, and, if the hyper parameter decreases, the regularization term decreases.

3. The method of claim 1, wherein the trained Neural Network and the tuned word embedding are used in conjunction with a search engine to produce results in response to the one or more terms inputted by the user.

4. The method of claim 1, wherein the Neural Network-based Neuro-Linguistic Programming task is a Convolutional Neural Network-based question answering task.

5. The method of claim 1, wherein:
the one or more terms inputted by the user represent a query;
the trained Neural Network and the tuned word embedding are incorporated into the Neural Network-based Neuro-Linguistic Programming task to obtain a response to the query; and
the incorporating of the trained Neural Network and the tuned word embedding into the Neural Network-based Neuro-Linguistic Programming task includes displaying, using a graphical user interface, the response to the user.

6. A system for training word embedding of domain-specific words, comprising:
a graphical user interface configured to enable a user to input one or more terms;
a processor, configured to:
train a first word embedding, using unsupervised data including a general domain corpus, on the one or more terms inputted by a user;
retrain the first word embedding, using a specific domain corpus, for a Neuro-Linguistic Programming task, to create a tuned word embedding, wherein the retraining of the first word embedding includes incorporating a list of terminologies from the domain specific corpus, and wherein the retraining of the first word embedding includes determining the list of terminologies by:
calculating a term frequency-inverse document frequency for each term in the general domain corpus;
calculating a term frequency-inverse document frequency for each term in the specific domain corpus; and
selecting terms in which a ratio of the term frequency-inverse document frequency for each word in the general corpus to the term frequency-inverse document frequency for each word in the specific domain corpus is larger than a predefined threshold, wherein the retraining of the first word embedding corrects for inappropriate results due to a high degree of cosine similarity between multiple words of phrases in the first word embedding;
train a Neural Network for the Neuro-Linguistic Programming task, using the specific domain corpus; and
incorporate the trained Neural Network and tuned word embedding into a Neural Network-based Neuro-Linguistic Programming task; and
a memory configured to store the one or more terms and the tuned word embedding,
wherein the processor retrains the first word embedding and trains the Neural Network together, and wherein the tuned word embedding is accelerated due to a change in a hyper parameter for domain-specific words.

7. The system of claim 6, wherein the hyper parameter is selected from the group consisting of a learning rate, a dropout rate, and a weight for a regularization term, and wherein, if the hyper parameter increases, the learning rate increases, and, if the hyper parameter decreases, the regularization term decreases.

8. The system of claim 6, wherein the trained Neural Network and the tuned word embedding are used in conjunction with a search engine to produce results in response to the one or more terms inputted by the user.

9. The system of claim 6, wherein the Neural Network-based Neuro-Linguistic Programming task is a Convolutional Neural Network-based question answering task.

10. The system of claim 6, wherein:
the one or more terms inputted by the user represent a query;
the trained Neural Network and the tuned word embedding are incorporated into the Neural Network-based Neuro-Linguistic Programming task to obtain a response to the query; and
the graphical user interface is further configured to display the response to the user.

11. A non-transitory computer-readable storage medium including a computer-readable program for training word embedding of domain-specific words, wherein the computer-readable program when executed on a computer causes the computer to perform a method comprising the steps of:
training, by a processor, a first word embedding, using unsupervised data including a general domain corpus, on one or more terms inputted by a user;
retraining, by the processor, the first word embedding, using a specific domain corpus, for a Neuro-Linguistic Programming task, to create a tuned word embedding, wherein the retraining of the first word embedding includes incorporating a list of terminologies from the domain specific corpus, and wherein the retraining of the first word embedding includes determining the list of terminologies by:
calculating a term frequency-inverse document frequency for each term in the general domain corpus;
calculating a term frequency-inverse document frequency for each term in the specific domain corpus; and
selecting terms in which a ratio of the term frequency-inverse document frequency for each word in the general corpus to the term frequency-inverse document frequency for each word in the specific domain corpus is larger than a predefined threshold, wherein the retraining of the first word embedding corrects for inappropriate results due to a high degree of cosine similarity between multiple words of phrases in the first word embedding;
training, by the processor, a Neural Network for the Neuro-Linguistic Programming task, using the specific domain corpus; and
incorporating, by the processor, the trained Neural Network and tuned word embedding into a Neural Network-based Neuro-Linguistic Programming task,
wherein the retraining of the first word embedding and the training of the Neural Network are performed together, and wherein the tuned word embedding is accelerated due to a change in a hyper parameter for domain-specific words.

12. The computer-readable storage medium of claim 11, wherein the hyper parameter is selected from the group consisting of a learning rate, a dropout rate, and a weight for a regularization term, and wherein, if the hyper parameter increases, the learning rate increases, and, if the hyper parameter decreases, the regularization term decreases.

13. The computer-readable storage medium of claim 11, wherein the Neural Network-based Neuro-Linguistic Programming task is a Convolutional Neural Network-based question answering task.

14. The computer-readable storage medium of claim 11, wherein the trained Neural Network and the tuned word embedding are used in conjunction with a search engine to produce results in response to the one or more terms inputted by the user.

\* \* \* \* \*